US010581547B2

(12) United States Patent
Nory et al.

(10) Patent No.: US 10,581,547 B2
(45) Date of Patent: Mar. 3, 2020

(54) METHODS AND APPARATUS FOR SYNCHRONIZATION TO, AND MEASUREMENTS ON, UNLICENSED FREQUENCY CARRIERS

(71) Applicant: Google Technology Holdings LLC, Mountain View, CA (US)

(72) Inventors: Ravikiran Nory, Buffalo Grove, IL (US); Ravi Kuchibhotla, Gurnee, IL (US); Robert Love, Barrington, IL (US); Vijay Nangia, Algonquin, IL (US); Ajit Nimbalker, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 550 days.

(21) Appl. No.: 14/867,900

(22) Filed: Sep. 28, 2015

(65) Prior Publication Data

US 2016/0095048 A1    Mar. 31, 2016

Related U.S. Application Data

(60) Provisional application No. 62/055,766, filed on Sep. 26, 2014.

(51) Int. Cl.
*H04J 11/00* (2006.01)
*H04W 24/08* (2009.01)
(Continued)

(52) U.S. Cl.
CPC ....... *H04J 11/0073* (2013.01); *H04J 11/0093* (2013.01); *H04L 27/0006* (2013.01);
(Continued)

(58) Field of Classification Search
CPC .............. H04J 11/0073; H04J 11/0093; H04L 27/0006; H04W 24/08
See application file for complete search history.

(56) References Cited

U.S. PATENT DOCUMENTS

2004/0240525 A1* 12/2004 Karabinis ............ H04B 7/2637
375/132
2009/0221289 A1* 9/2009 Xu ........................ H04L 1/0023
455/435.1

(Continued)

OTHER PUBLICATIONS

U.S. Appl. No. 62/012,616, filed Jun. 2014, Frenne et al.*
(Continued)

*Primary Examiner* — Jael M Ulysse
(74) *Attorney, Agent, or Firm* — Colby Nipper PLLC

(57) ABSTRACT

Briefly, the present disclosure is directed to methods and apparatus that allow for the synchronization with, and measurement reporting of, unlicensed frequency carriers. A method and apparatus for synchronizing to an Scell operating on an unlicensed carrier determine, at a UE (108, 116), one or more measurement instances where a discovery signal may be transmitted, for example, by a base station (132), on the Scell from a higher layer configuration message. The method and apparatus may monitor a control channel for a control channel message and determine whether the discovery signal will be transmitted during one or more measurement instances on the Scell. The method and apparatus may detect the discovery signal transmission on the Scell during one or more of the measurement instances. The method and apparatus may also synchronize to and/or measure the Scell based on detected discovery signal transmissions.

13 Claims, 10 Drawing Sheets

(51) Int. Cl.
*H04L 27/00* (2006.01)
*H04L 5/00* (2006.01)
*H04L 27/26* (2006.01)

(52) U.S. Cl.
CPC .............. *H04W 24/08* (2013.01); *H04L 5/001* (2013.01); *H04L 5/0032* (2013.01); *H04L 27/2655* (2013.01)

(56) References Cited

U.S. PATENT DOCUMENTS

| | | | | |
|---|---|---|---|---|
| 2009/0325626 | A1* | 12/2009 | Palanki | H04L 5/0007 455/522 |
| 2012/0282942 | A1* | 11/2012 | Uusitalo | H04W 16/14 455/452.2 |
| 2012/0307820 | A1* | 12/2012 | Tomatis | H04B 1/70755 370/350 |
| 2013/0016630 | A1* | 1/2013 | Bhushan | H04W 48/12 370/255 |
| 2013/0059610 | A1* | 3/2013 | Siomina | H04W 24/10 455/456.6 |
| 2013/0136095 | A1* | 5/2013 | Nishio | H04L 5/0007 370/329 |
| 2013/0165134 | A1* | 6/2013 | Touag | H04W 72/0486 455/452.1 |
| 2013/0188580 | A1* | 7/2013 | Dinan | H04W 52/281 370/329 |
| 2013/0201884 | A1* | 8/2013 | Freda | H04W 72/005 370/278 |
| 2013/0208587 | A1* | 8/2013 | Bala | H04W 16/14 370/230 |
| 2013/0322279 | A1* | 12/2013 | Chincholi | H04W 24/10 370/252 |
| 2013/0336156 | A1* | 12/2013 | Wei | H04L 5/001 370/252 |
| 2013/0337821 | A1* | 12/2013 | Clegg | H04L 5/0062 455/452.1 |
| 2014/0029458 | A1* | 1/2014 | Ye | H04W 24/10 370/252 |
| 2014/0036853 | A1* | 2/2014 | Kim | H04W 16/14 370/329 |
| 2014/0050206 | A1* | 2/2014 | Seo | H04J 11/0069 370/336 |
| 2014/0086173 | A1* | 3/2014 | Sadeghi | H04L 5/005 370/329 |
| 2014/0112277 | A1* | 4/2014 | Yang | H04L 5/001 370/329 |
| 2014/0198676 | A1* | 7/2014 | Han | H04W 24/10 370/252 |
| 2014/0274030 | A1* | 9/2014 | Aminzadeh | H04W 52/0238 455/424 |
| 2015/0016312 | A1* | 1/2015 | Li | H04W 74/0833 370/280 |
| 2015/0063151 | A1* | 3/2015 | Sadek | H04W 24/08 370/252 |
| 2015/0085792 | A1* | 3/2015 | Reddy | H04L 5/0098 370/329 |
| 2015/0110066 | A1* | 4/2015 | Gaal | H04W 72/0453 370/330 |
| 2015/0163680 | A1* | 6/2015 | Valliappan | H04W 16/14 370/329 |
| 2015/0296486 | A1* | 10/2015 | Park | H04W 76/025 370/329 |
| 2015/0312784 | A1* | 10/2015 | You | H04L 1/0693 370/252 |
| 2015/0341877 | A1* | 11/2015 | Yi | H04W 56/00 370/350 |
| 2015/0365152 | A1* | 12/2015 | Frenne | H04B 7/0626 370/252 |
| 2015/0365931 | A1* | 12/2015 | Ng | H04L 1/1812 370/329 |
| 2018/0006776 | A1* | 1/2018 | Fwu | H04L 5/0001 |

OTHER PUBLICATIONS

U.S. Appl. No. 62/012,616, "Channel State Information Measurements for License-Assisted Access", Frenne et al., Fig. 1-10, p. 1-11.*

3GPP TSG-RAN WG1 #76, R1-140452 "Small cell on/off time reduction," Qualcomm Incorporated, Feb. 10-14, 2014, Prague, Czech Republic.

* cited by examiner

METHODS AND APPARATUS FOR SYNCHRONIZATION TO, AND MEASUREMENTS ON, UNLICENSED FREQUENCY CARRIERS

RELATED APPLICATIONS

This application is a nonprovisional of U.S. Provisional Application No. 62/055,766, filed on Sep. 26, 2014, and titled "Synchronisation and Measurements for LTE on an Unlicensed Carrier," the entire contents of which are hereby incorporated by reference.

TECHNICAL FIELD

The present disclosure is related generally to wireless communications and, more specifically, to unlicensed frequency carrier synchronization and unlicensed frequency carrier measurement methods.

BACKGROUND

The performance of wireless mobile computing devices is affected by the capabilities of the underlying network technologies. To provide voice and data communication capabilities, cellular wireless communication systems are widely deployed, which use a variety of radio access technologies (RATs). Such systems may be multiple-access systems able to support communication with multiple users by sharing system resources such as bandwidth, frequency, and transmission power. Commonly used multiple-access systems include, but are not limited to, Long Term Evolution (LTE) systems, Code-Division Multiple Access (CDMA) systems, Time-Division Multiple Access (TDMA) systems, Frequency-Division Multiple Access (FDMA) systems, Orthogonal Frequency-Division Multiple Access (OFDMA) systems, and the like. These communication systems, sometimes standardized by organizations such as the $3^{rd}$ Generation Partnership Project (3GPP) or the Institute of Electrical and Electronics Engineers (IEEE), may allow for voice communications and, additionally or alternately, may provide for the exchange of packet data, such as to, for example, access the Internet.

These communication systems may operate within licensed spectrums (e.g., frequency ranges). Licensed spectrums include portions of the radio spectrum reserved for use by licensed organizations. For example, in the United States, the Federal Communication Commission (FCC) regulates radio communications. These licensed organizations have exclusive use of the radio spectrum over geographic areas that they have been granted licenses for. One benefit of operating communication systems within licensed spectrums is the minimal interference these systems experience from other systems operating in the same frequency range. These same communication systems, however, may also operate within unlicensed spectrums. As such, communication systems operating within unlicensed spectrums may experience interference from other systems operating within the same frequency ranges. For example, LTE systems may operate within frequency ranges that another communication system, such as a Wi-Fi (e.g., IEEE 802.11n) communication system, also operates within. When two communication systems operate within the same frequency ranges, communications for one system may interfere with communications on the other system, and vice versa.

To maintain synchronization with a frequency carrier signal, communication systems may employ the use of synchronization signals. For example, in LTE systems, a base station (e.g., eNB) may transmit a primary synchronization signal (PSS) and secondary synchronization signal (SSS) at a periodic rate (e.g., once every 5 msecs) to enable user equipment (UEs) to maintain time and frequency synchronization with an LTE frequency carrier signal. UEs may also utilize transmitted cell-specific reference signals (CRSs) for similar synchronization purposes. For example, a UE operating within an LTE system may synchronize to PSS and SSS signals, and subsequently detect and acquire the CRS transmission for time and/or frequency tracking and/or automatic gain control (AGC) loop maintenance. In addition, the use of a discovery signal is proposed in LTE such that UEs are expected to detect and measure neighbor cells and/or secondary cells (Scells) using the discovery signal. The discovery signal may be, for example, a combination of PSS, SSS, and CRS subframes transmitted at a periodic rate (e.g., up to 5 msecs of populated subframes every 100 msecs). For example, LTE Release 12 UEs are expected to detect and measure at least neighbor cells and secondary serving cells using the discovery signal. FIG. 8 depicts synchronization transmissions in LTE Release 8/9/10/11 and also the discovery signal transmissions that are being considered for LTE Release 12. After an LTE UE acquires PSS/SSS it is able accurately identify LTE symbol (~70 us) and subframe (1 ms) boundaries. Subsequently, the UE uses CRS transmissions from the cell for time/frequency tracking and AGC loop maintenance.

For communication systems operating within the Wi-Fi standard (e.g., IEEE 802.11n, infrastructure mode), access points (APs) transmit beacon frames that that contain information relevant for synchronization and discovery. For example, synchronization between APs and stations (STAs) (e.g., UE) in a Wi-Fi communication system is maintained via a timing synchronization function (TSF) where beacon frames transmitted by an AP contain a TSF timestamp value that is used by STAs to synchronize their own timer's TSF timer value. A receiving STA may accept the timing information in beacon frames sent from the AP, and if the STA's TSF timer value is different from the timestamp value in the received beacon frame, the receiving STA sets its local TSF timer value to the received timestamp value.

In addition, Wi-Fi APs may transmit beacon frames according to a beacon period (e.g., 100 msecs) that defines a series of Target Beacon Transmission Times (TBTTs) (e.g., 0 ms, 100 ms, 200 ms . . . ). At each TBTT, the AP may schedule a beacon frame as the next frame for transmission. As shown in FIG. 9, beacon frames are transmitted only if the transmission medium is determined to be free. If the transmission medium is busy (e.g., current transmissions are detected), the beacon frame transmission is deferred until the next available transmission opportunity. Subsequent beacon frames, however, are not also deferred (unless the transmission medium is busy at their scheduled TBTT), but rather are still scheduled at their pre-determined TBTTs.

In addition to the time synchronization provided by Wi-Fi's TSF mechanism described above, Wi-Fi may also include a preamble that precedes data transmission in every physical layer convergence protocol data unit (PPDU). The length of the preamble depends on a number of factors including Wi-Fi specification version (e.g., 802.1111g vs. 802.11n), the number of spatial streams, and the sounding formats supported. For example, for 802.11n, assuming mixed format preamble transmission, 4 spatial streams, non-sounding PPDU, the preamble duration is L-STF(8 us)+L-LTF(8 us)+L-SIG(4 us)+HT-SIG(4 us)+HT-STF(4 us)+4*HT-LTF(4*4=16 us)=44 us. The short training fields (STF) in the preamble can be used to determine fine timing. Preamble transmission for 802.11n is illustrated in FIG. 10. The preamble may be used by a receiving AP or UE to assist in synchronization and AGC maintenance.

Referencing back to the LTE communication system, base stations may operate primary cells (Pcell) that operate on licensed carriers (e.g., frequency carrier operating within licensed spectrum), and/or Scells that operate on licensed or unlicensed carriers (e.g., frequency carrier operating within unlicensed spectrum) (e.g., long-term evolution unlicensed spectrum (LTE-U)). If the base station operates the Scell on a licensed carrier, the base station is expected to transmit at least the following: 1) PSS/SSS with 5 ms periodicity and CRS in every subframe if the Scell does not support on/off; 2) Small cell discovery signal (SCDS—e.g. PSS/SSS+CRS, or a modified version of CSI-RS) with longer periodicity (e.g. 100 ms) if the Scell supports on/off. Additional assistance signaling regarding sequence identification information for the discovery signal and timing (e.g., periodicity and subframe offset of discovery signal) can also be provided by the Pcell. As such, the UE may use the transmitted discovery signals and assistance information to detect and synchronize to the Scell. Because the base station transmits on the Scell, which is operating on a licensed carrier, the discovery signals are transmitted with known periodicity and known symbol/subframe locations. As such, a UE can correlate with these signals and determine symbol/subframe timing for the Scell. The UE may also perform measurements on the Scell operating on a licensed carrier. For example, as is known in the art, the UE may perform radio resource management (RRM) measurements, such as measuring the Scell's reference signal received power (RSRP) and/or reference signal received quality (RSRQ). The UE, as known in the art, may also report the various measurements to a base station or some other network device.

If, however, the base station is operating an Scell on an unlicensed carrier (e.g., LTE-U), the base station is expected to implement a 'listen before talk' (LBT) strategy (i.e., the base station has to detect (e.g., sense) if there are transmissions on the unlicensed frequency carrier, and transmit only if no other transmission is detected on the unlicensed frequency carrier), similar to the strategy Wi-Fi employs and discussed above. Given this, it is not possible for the base station to make periodic discovery signal transmissions with a known pattern without violating the LBT strategy, as the frequency carrier may not be free for transmission during all occasions of scheduled discovery signal transmissions. As such, there are opportunities for improvements to synchronization with, and measurement reporting of, unlicensed frequency carriers.

BRIEF DESCRIPTION OF THE DRAWINGS

The disclosure will be more readily understood in view of the following description when accompanied by the below figures and wherein like reference numerals represent like elements, wherein.

DETAILED DESCRIPTION

Figure 1:
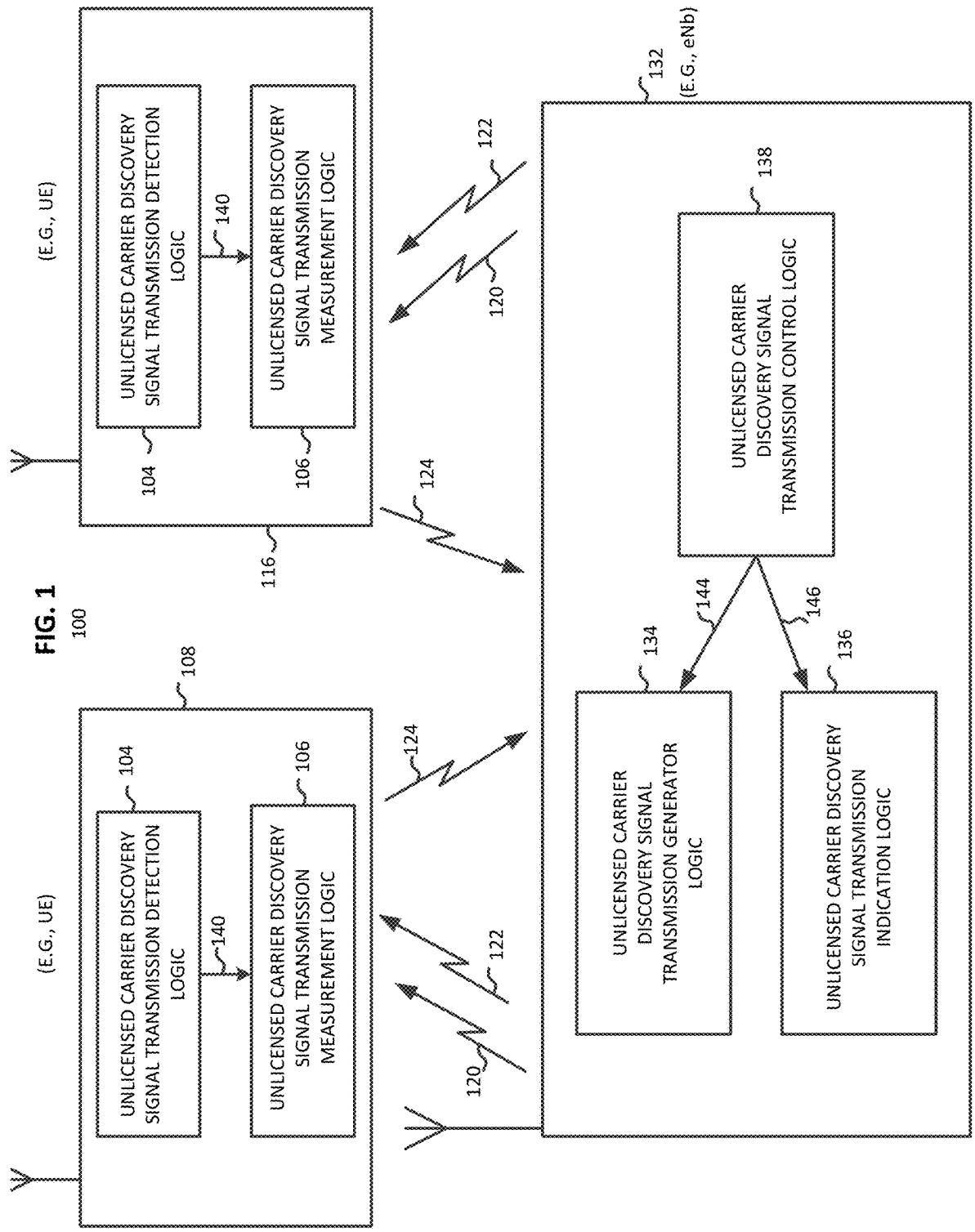
FIG. 1 is a functional block diagram illustrating an example of a system in accordance with one example described herein.

Briefly, the present disclosure is directed to methods and apparatus that allow for the synchronization with, and measurement reporting of, unlicensed frequency carriers. In one embodiment, a method and apparatus for synchronizing to an Scell operating on an unlicensed carrier determine, at a UE, one or more measurement instances where a discovery signal may be transmitted on the Scell operating on an unlicensed carrier based on a higher layer configuration message (also referred to herein as an unlicensed spectrum measurement instance configuration message) such as a radio resource configuration (RRC) message. For example, a base station may transmit, on a Pcell operating on licensed spectrum, the unlicensed spectrum measurement instance configuration message indicating to a UE one or more measurement instances where a discovery signal may be transmitted on the Scell operating on an unlicensed carrier. The unlicensed spectrum measurement instance configuration message may indicate to a UE, for example, that a discovery signal transmission is to be expected in subframes {{x,x+1}, {x+40,x+41}, {x+80,x+81}, ... }, where x can be a subframe index relative to a system frame number (SFN) 0. The discovery signal may include, for example, periodic transmissions of PSS/SSS and/or CRS, whereby the measurement instances include subframes associated with these periodic discovery signal transmissions. In one example, the discovery signal comprises PSS, SSS, and CRS transmitted in a 1 msec subframe every 80 msec. In another example, the discovery signal comprises a burst of three 1 msecs subframes transmitted every 160 msecs with a first subframe containing PSS, SSS, and CRS, and second and third subframes containing only CRS. The base station may transmit the unlicensed spectrum measurement instance configuration message to UE's operating on the Pcell.

The method and apparatus may determine whether the discovery signal will be transmitted during at least one of the measurement instances on the Scell operating on an unlicensed carrier based upon a control channel message (also referred to herein as an unlicensed spectrum control channel message). For example, the base station may transmit to UEs, on a Pcell operating on a licensed carrier, an unlicensed spectrum control channel message associated with the discovery signal indicating whether the discovery signal will be transmitted on the Scell operating on an unlicensed carrier during one or more of the measurement instances. This allows the base station to mute the discovery signal in transmission instances where the Scell is occupied. The base station may transmit the discover signal at a later time (e.g., move the discovery signal). For example the base station may determine whether the frequency carrier is occupied by sensing a channel (e.g., by performing clear channel assessment as known in the art). If the channel is not occupied, the base station may determine to transmit a discovery signal in the next available measurement instance. If the channel is occupied, the base station may mute, or mute and move, the discovery signal transmission. More generally, this enables the base station to transmit the discovery signal only on an as needed basis, i.e., it enables an 'on-demand' detection and measurement procedure for the Scell operating on an unlicensed carrier. For example, UEs may measure the channel only when an unlicensed spectrum control channel message indicates that a discovery signal will be present during a measurement instance. The method and apparatus may then detect the discovery signal transmission on the Scell operating on an unlicensed carrier during one or more of the measurement instances based on the unlicensed spectrum control channel message indications. The method and apparatus may also synchronize to the Scell operating on an unlicensed carrier based on the detected discovery signal transmission.

In one example, a base station reserves an unlicensed frequency carrier, such as a Scell, and sends a frequency carrier aggregation (CA) activation command to a UE for frequency carrier activation purposes as is known in the art. The base station may then begin discovery signal transmission on the Scell operating on an unlicensed carrier, and the UE may use the discovery signal for time and/or frequency synchronization. The UE may also utilize the discovery signal for channel state information (CSI) reporting purposes during frequency carrier activation. In one example, once a UE has synchronized to the Scell, a base station may deactivate the Scell on the unlicensed frequency carrier when there is no data transmission to the UE. The UE may then measure and report RRM measurements on the unlicensed frequency carrier using the discover signal. For example, a received unlicensed spectrum control channel message may indicate to a UE that a discovery signal will be transmitted on the Scell operating on an unlicensed carrier during the next measurement instance. As such, the UE may make RRM measurements during the next measurement instance and report those measurements to, for example, the base station. In another example, the unlicensed spectrum control channel message may indicate to a UE that a discovery signal will be transmitted on the Scell operating on an unlicensed carrier during a future measurement instance that is offset a number of subframes from the subframe corresponding to the next immediate measurement instance.

In one embodiment, the method and apparatus determine that the unlicensed spectrum control channel message is associated with a radio network temporary identifier (RNTI) configured for the UE. In one embodiment, the method and apparatus determine whether the discovery signal will be transmitted during at least one of the measurement instances on the Scell operating on an unlicensed carrier based on successfully decoding the unlicensed spectrum control channel message. For example, the method and apparatus may determine that the discovery signal will be transmitted on the Scell operating on an unlicensed carrier during at least one of the measurement instances based upon successfully decoding the unlicensed spectrum control channel message.

In one example, the UE monitors the Pcell for an unlicensed spectrum control channel message that includes cyclic redundancy check (CRC) bits that are masked by the UE's configured RNTI. The unlicensed spectrum control channel message may be sent on a physical downlink control channel (PDCCH) or an enhanced physical downlink control channel (EPDCCH), for example. The UE may monitor the search space on the Pcell in a subset of subframes either fully or partially overlapping with the set of measurement instances where the discovery signal is expected on the Scell. For example, if discovery signal transmission is expected in subframes {{x,x+1}, {x+40,x+41}, {x+80,x+81}, . . . }, the UE may monitor the PDCCH/EPDCCH channels on the Pcell for unlicensed spectrum control channel messages that include CRC bits scrambled by the UE's configured RNTI in subframes {{x−1,x,x+1}, {x+39,x+40,x+41}, {x+79,x+80,x+81}, . . . }. Alternately, the UE can monitor the Pcell for unlicensed spectrum control channel messages in all non-discontinuous reception (DRX) subframes. In one example, the method and apparatus receive the unlicensed spectrum measurement instance configuration message in a control channel that is one of a PDCCH and EPDCCH. In one example, the discovery signal includes periodic transmissions of at least a PSS and a SSS.

In one example, the unlicensed spectrum control channel message includes downlink control information (DCI). The DCI may indicate, for example, that the discovery signal will be present in at least one of the measurement instances. For example, after successfully decoding an unlicensed spectrum control channel message including DCI, a UE may determine that the discovery signal will be present in the next measurement instance. In one example, if the UE successfully decodes an unlicensed spectrum control channel message encoded with CRC scrambled by RNTI, the UE examines the DCI contents of the unlicensed spectrum control channel message to determine whether the discovery signal will be present on the Scell in the next measurement instance. This approach may be useful, for example, in a case where the UE is configured with multiple Scells (e.g., each on a separate unlicensed carrier). In this way, the DCI contents of the unlicensed spectrum control channel message may contain a bitmap where each bit in the bitmap corresponds to a particular Scell, indicating whether the discovery signal of that Scell is present in the next measurement instance. In this embodiment the RNTI configured for the UE may be associated with discovery signals on multiple Scells on which the UE is configured to perform measurements, for example, such as RSRP or RSRQ.

In one example, the method and apparatus may determine that the discovery signal will be transmitted during a measurement instance on the Scell operating on an unlicensed carrier based upon unsuccessfully decoding the unlicensed spectrum control channel message. For example, the base station may encode an unlicensed spectrum control channel message based on a UE's associated RNTI, indicating that the discovery signal will not be transmitted during the next measurement instance. When the discovery signal will be transmitted during a next measurement instance, the base station may not transmit an unlicensed spectrum control channel message. Alternatively, the base station may transmit an unlicensed spectrum control channel message encoded with an RNTI that is not associated with a receiving UE. As such, the UE will not be able to successfully decode the unlicensed spectrum control channel message and will determine that the discovery signal will be transmitted during the next measurement instance on the Scell operating on an unlicensed carrier.

In one example, the UE determines that that the discovery signal will not be transmitted during a next measurement instance based upon successfully decoding an unlicensed spectrum control channel message, but rather will be transmitted during an alternate measurement instance of the one or more measurement instances. For example, a UE may receive from a base station an unlicensed spectrum control channel message indicating that the discovery signal will be not be transmitted during the next measurement instance, but rather will be transmitted a number of measurement instances from the next measurement instance (e.g., 1 measurement instance from the next one). In one example, if the UE detects the unlicensed spectrum control channel message in a particular subframe, e.g., subframe x, on the Pcell, the next measurement instance may begin from a corresponding subframe x on the Scell. In an alternate embodiment, the next measurement instance may begin from another subframe on the Scell that is offset from the subframe received on the Pcell containing the unlicensed spectrum control channel message. The offset may be optionally embedded in the DCI contents of the unlicensed spectrum control channel message. In this event, the UE would now monitor the Scell for the subframe that has been offset to receive the discovery signal.

In one example, the unlicensed spectrum control channel message is received at least in a first subframe that overlaps at least partially in time with one or more measurement instances. In one example, the method and apparatus perform a measurement, such as an RSRP or RSRQ measurement, on the discovery signal during at least one measurement instance of the one or more measurement instances. The method and apparatus may then report a measurement value based on performed measurement. For example, a UE may determine that, based on a received unlicensed spectrum control channel message, the discovery signal will be transmitted during the next measurement instance. The UE may then measure the Scell during the next measurement instance and report measurement data based on that measurement to a base station.

In one example, the method and apparatus monitor the Scell for PSS and/or SSS transmissions. If the method and apparatus detect PSS and/or SSS transmissions, the method and apparatus assume that a SCDS was transmitted during that time. The method and apparatus may proceed to perform measurements such as RSRP and RSRQ, and may report any such measurement values. Otherwise, the UE assumes that the SCDS was not transmitted and skips performing measurements in that SCDS occasion.

In one embodiment, where a discovery signal is not supported on the Scell operating on an unlicensed carrier, cell synchronization and/or AGC settling may be handled by transmission of either existing reference signals (e.g., CRS) or a new preamble sequence before data transmission. For example, even after a UE is configured for a Scell operating on an unlicensed carrier, the UE has no expectation of CRS transmissions on the Scell until it receives an activation command for the Scell. Upon reception of the activation command, the UE uses CRS transmission on the Scell to acquire synchronization and/or for AGC maintenance. Because there is no discovery signal support, the UE does not perform any RRM measurements on the unlicensed carrier. A base station may decide, however, whether to configure or activate the UE to the Scell based on other information such as UE location and radio frequency (RF) fingerprint. In addition, the base station may request the UE to send a 'one shot' measurement report based on measurements done over a few subframes following the request.

Stated another way, a method in a UE connected to a Pcell operating on a licensed carrier, and configured with a Scell operating on an unlicensed carrier, includes determining, from a higher layer configuration message, a set of measurement instances where a discovery signal can be present; the discovery signal comprising periodic transmissions of at least a PSS and a SSS. The method may also include monitoring, on the Pcell, a control channel using a RNTI associated with the discovery signal, in a first subframe. In addition, the method may include determining a measurement instance associated with the first subframe from the set of measurement instances, determining that the discovery signal is present in the measurement instance if the control channel is not successfully decoded in the first subframe, or determining that the discovery signal is not present in the measurement instance if the control channel is successfully decoded in the first subframe. The method may also include performing a first measurement on the discovery signal in at least one measurement instance in the set of measurement instances, and reporting a measurement value based on at least the first measurement.

In one example, the measurement instance at least partially overlaps with the first subframe in the time domain. In another example, the first control channel is one of a PDCCH and an EPDCCH. In yet another example, determining that the discovery signal is not present in the measurement instance if the control channel is successfully decoded in the first subframe further includes determining a DCI from the successfully decoded control channel and determining that the discovery signal is not present in the measurement instance based on information indicated in the DCI.

The method may also include determining an alternate measurement instance and a second subframe from the control channel, if the control channel is successfully decoded, monitoring, on the Pcell, the control channel using the radio network temporary identifier (RNTI) associated with the discovery signal, in the second subframe, determining that the discovery signal is present in the alternate measurement instance if the control channel is not successfully decoded in the second subframe, performing a second measurement on the discovery signal in the alternate measurement instance, and reporting a measurement value based on at least the second measurement. In an alternate embodiment, the alternate measurement instance does not belong to the set of measurement instances determined from the higher layer configuration message and the alternate measurement instance does not overlap with the first subframe in time domain.

Turning now to the drawings, FIG. 1 shows a system 100 including a base station (e.g., eNb) 132 and UE's 108, 116. Base station 132 includes unlicensed frequency carrier discovery signal transmission control logic 138 operatively coupled to unlicensed frequency carrier discovery signal transmission generator logic 134 over communication link 144, and to unlicensed frequency carrier discovery signal transmission indication logic 136 over communication link 146. The UEs 108, 116 include unlicensed frequency carrier discovery signal transmission detection logic 104 operatively coupled to unlicensed frequency carrier discovery signal transmission measurement logic 106 over communication link 140. In some embodiments, some or all of the functions of base station 132 and/or UEs 108, 116 may be performed by any suitable processor or processors executing suitable instructions such as a central processing unit (CPU), or by any other suitable logic as known in the art.

As mentioned above, base station 132 includes unlicensed frequency carrier discovery signal transmission control logic 138, which is operable to transmit on, for example, a Pcell operating on a licensed carrier, an unlicensed spectrum measurement instance configuration message 120. The unlicensed spectrum measurement instance configuration message 120 may include an indication of (e.g., data within the message that indicates) one or more measurement instances where a discovery signal may be transmitted on a Scell operating on an unlicensed carrier. Base station 132 also includes unlicensed frequency carrier discovery signal transmission indication logic 136, which is operably coupled to the unlicensed frequency carrier discovery signal transmission control logic 138. Unlicensed frequency carrier discovery signal transmission indication logic 136 is configured to transmit on, for example, a Pcell, an unlicensed spectrum control channel message 122 indicating whether a discovery signal will be transmitted on an Scell operating on an unlicensed carrier during one or more measurement instances. Base station 132 also includes unlicensed frequency carrier discovery signal transmission generator logic 134 operably coupled to the unlicensed frequency carrier discovery signal transmission control logic 138 and configured to transmit, on an Scell operating on an unlicensed carrier, a discovery signal, such as one that includes periodic transmissions of at least a PSS and an SSS. For example, unlicensed frequency carrier discovery signal transmission control logic 138 may transmit an unlicensed spectrum measurement instance configuration message 120 to a UE indicating measurement instances on a Scell operating on an unlicensed carrier of where a discovery signal may be transmitted. Unlicensed frequency carrier discovery signal transmission control logic 138 may also configure unlicensed frequency carrier discovery signal transmission indication logic 136 to transmit an unlicensed spectrum control channel message 122 indicating to the UE that a discovery signal will be transmitted on a Scell operating on an unlicensed carrier during a next measurement instance. Unlicensed frequency carrier discovery signal transmission control logic 138 may also configure unlicensed frequency carrier discovery signal transmission generator logic 134 to transmit the discovery signal during one or more measurement instances, such as the next measurement instance.

As mentioned above, UEs 108, 116 include unlicensed frequency carrier discovery signal transmission detection logic 104, which is configured to determine, from an unlicensed spectrum measurement instance configuration message 120, one or more measurement instances where a discovery signal may be transmitted on a Scell operating on an unlicensed carrier. Unlicensed frequency carrier discovery signal transmission detection logic 104 may also be configured to receive, on a Pcell, an unlicensed spectrum control channel message 122 associated with the discovery signal indicating whether the discovery signal will be transmitted during at least one of the one or more measurement instances on the Scell operating on an unlicensed carrier. Unlicensed frequency carrier discovery signal transmission detection logic 104 may also be configured to determine whether the discovery signal will be transmitted during at least one of the Scell operating on an unlicensed carrier measurement instances based on the received unlicensed spectrum control channel message 122. Unlicensed frequency carrier discovery signal transmission detection logic 104 may be configured to detect the discovery signal transmission on the Scell operating on an unlicensed carrier, for example, during one or more of the measurement instances on the Scell operating on an unlicensed carrier, and to synchronize to the Scell operating on an unlicensed carrier based on the detected discovery signal transmission.

Unlicensed frequency carrier discovery signal transmission measurement logic 106 is operably coupled to unlicensed frequency carrier discovery signal transmission detection logic 104 and is configured to perform a measurement on the discovery signal during at least one measurement instance, and may also be configured to report a measurement value 124 based on at least the performed measurement. For example, a measurement value 124 may be transmitted to base station 132. In one example, unlicensed frequency carrier discovery signal transmission detection logic 104 configures unlicensed frequency carrier discovery signal transmission measurement logic 106 to perform at least one measurement on a discovery signal during a measurement instance when unlicensed frequency carrier discovery signal transmission detection logic 104 has determined that a discovery signal will be available during that measurement instance from an unlicensed spectrum control channel message 122.

Figure 2:
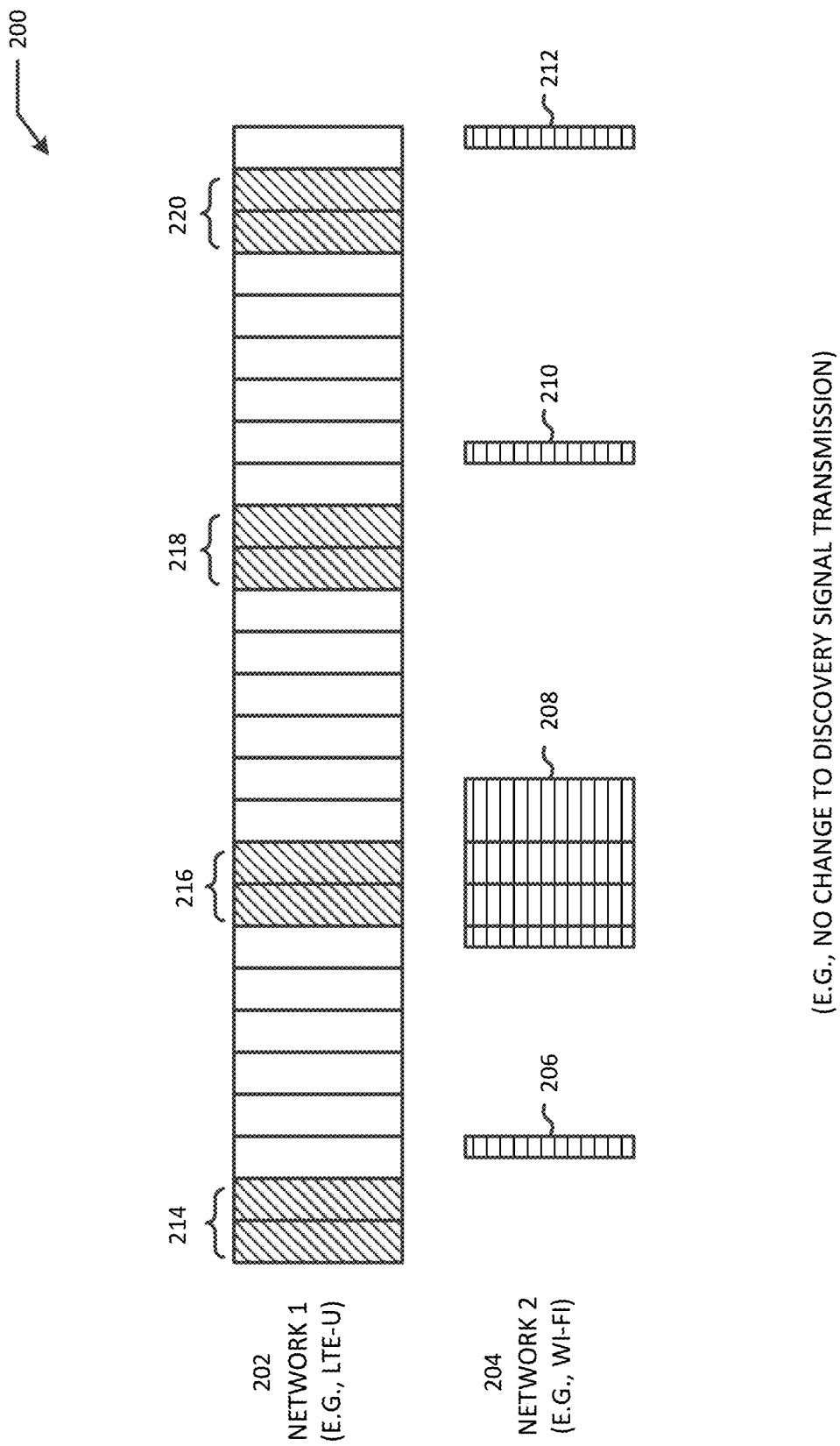
FIG. 2 is a timing diagram illustrating one example of transmissions within two networks operating within a same frequency spectrum whereby a discovery signal is transmitted within subframes on one network regardless of simultaneous transmissions on a second network in accordance with one example described herein.

FIG. 2 provides a timing diagram 200 illustrating one example of signals transmitted within subframes on network 1 202, and signal transmissions on network 2 204, where the two networks operate within a same spectrum (e.g., overlapping frequency ranges). For example, network 1 202 may be an LTE-U network, while network 2 204 may be a Wi-Fi network. As shown in the timing diagram, a discovery signal is transmitted within subframes 214, 216, 218, 220 on network 1 202 regardless of simultaneous signal transmissions 206, 208, 210, 212 on network 2 204. For example, a base station may transmit the discovery signal periodically (e.g., a discovery signal transmission schedule) regardless of other transmissions. As such, a base station operating on network 1 202 may transmit a discovery signal in predetermined transmission instances (e.g., such as during subframes 214, 216, 218, 220) irrespective of other signal transmissions, such as signal transmission 208, on the same frequency carrier. Thus, a UE may receive the discovery signal and processes it in the same manner as it would on a licensed frequency carrier.

Figure 3:
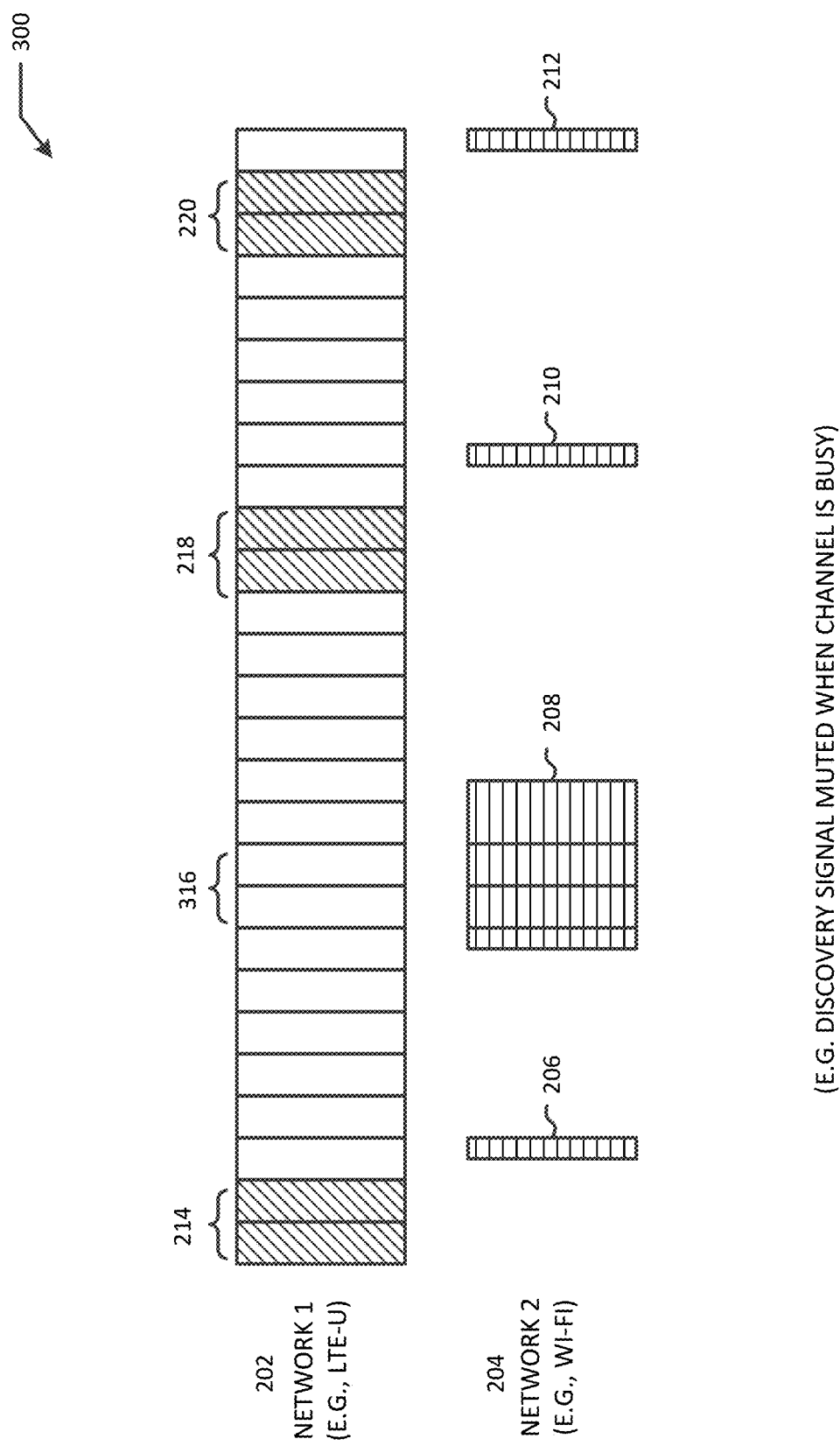
FIG. 3 is a timing diagram illustrating one example of transmissions within two networks operating within a same frequency spectrum whereby a discovery signal is muted (e.g., not transmitted) during subframes on one network during what would otherwise be simultaneous transmissions on a second network in accordance with one example described herein.

FIG. 3 includes elements from FIG. 2 and provides a timing diagram 300 illustrating one example of muting a discovery signal on network 1 202 during signal transmissions on network 2 204, where the two networks operate within a same spectrum. For example, as indicated in the figure, the discovery signal 216 of FIG. 2 is now muted during subframes 316. Subframes 214, 218, 220, however, continue to include the discovery signal at, for example, a predetermined discovery signal transmission schedule. For example a base station may determine whether the frequency carrier is occupied by sensing the channel. If the channel is occupied during what is supposed to be a discovery signal transmission, such as is indicated by transmissions 208 on network 2 204, the base station may mute the discovery signal transmission, as indicated by subframes 316.

Figure 4:
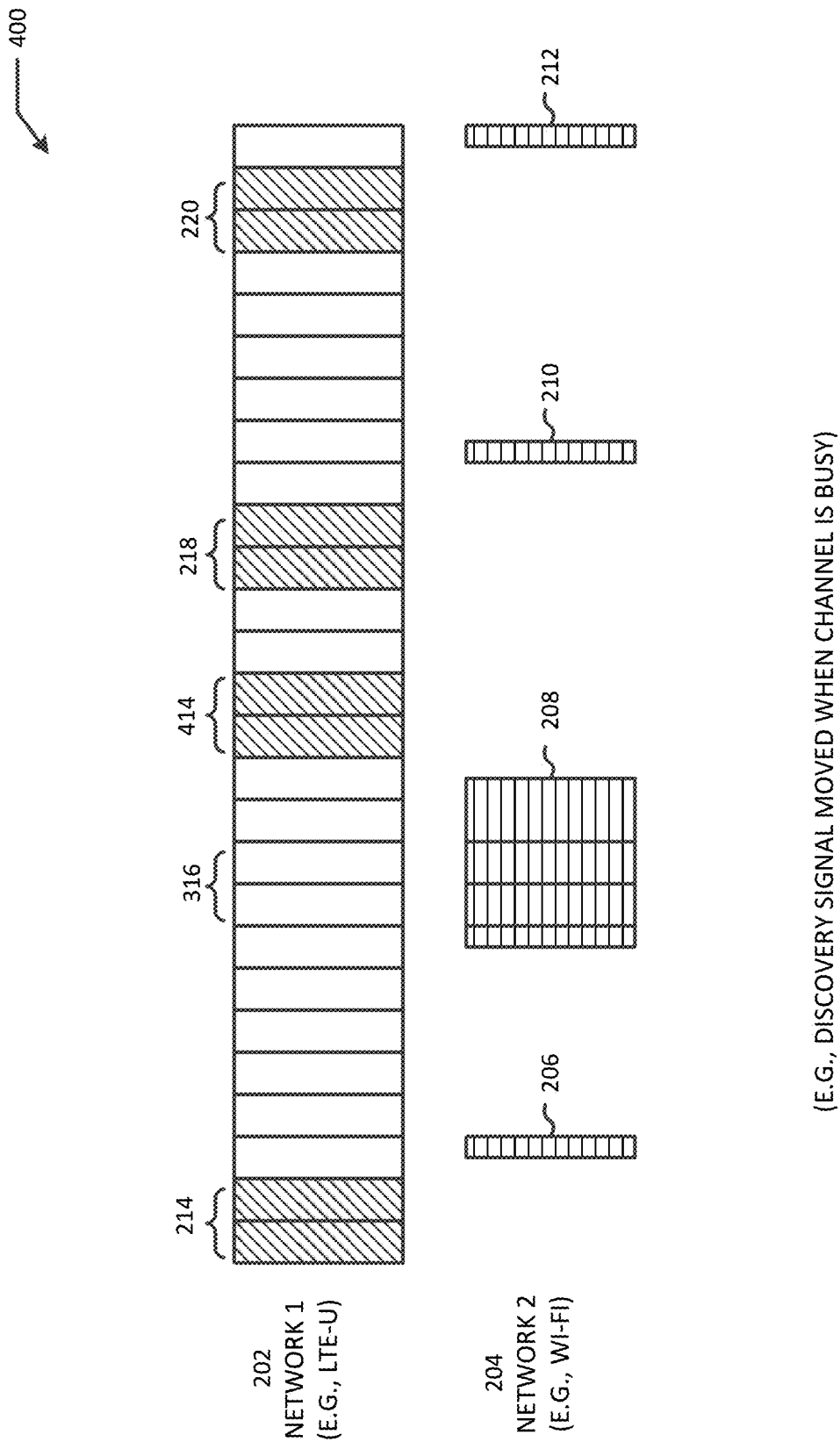
FIG. 4 is a timing diagram illustrating one example of transmissions within two networks operating within a same frequency spectrum whereby a discovery signal is moved to different subframes on one network during what would otherwise be simultaneous transmissions on a second network in accordance with one example described herein.

FIG. 4 includes elements from FIG. 2 and FIG. 3, and provides a timing diagram 400 illustrating one example of muting, and moving, a discovery signal on network 1 202 during signal transmissions on network 2 204, where the two networks operate within a same spectrum. Similar to FIG. 3, the discovery signal is muted during subframes 316 due to the transmissions 208 on network 2 204. However, rather than not transmitting the discovery signal during this time and continuing with the next periodic discovery signal transmission, the discovery signal that was supposed to transmit during subframes 316 is transmitted during subframes 414 (e.g., the discovery signal was moved from subframes 316 to subframes 414). As such, the discovery signal is transmitted during a time at which there is no or little interference from network 2 204. The periodic discovery signal transmissions continue, as indicated by subframes 218, 220. In one example, a base station may transmit an unlicensed spectrum control channel message 122 indicating that a UE should or should not expect the discovery signal in a particular Scell subframe (or window of subframes, e.g., depending on a timing uncertainty between the Pcell and Scell). For example, the unlicensed spectrum control channel message 122 may indicate that the UE should not expect the discovery signal in the next transmission instance, and identifies the next out of place transmission instance (e.g., a number of subframes after a subframe corresponding to the next transmission instance).

Figure 5:
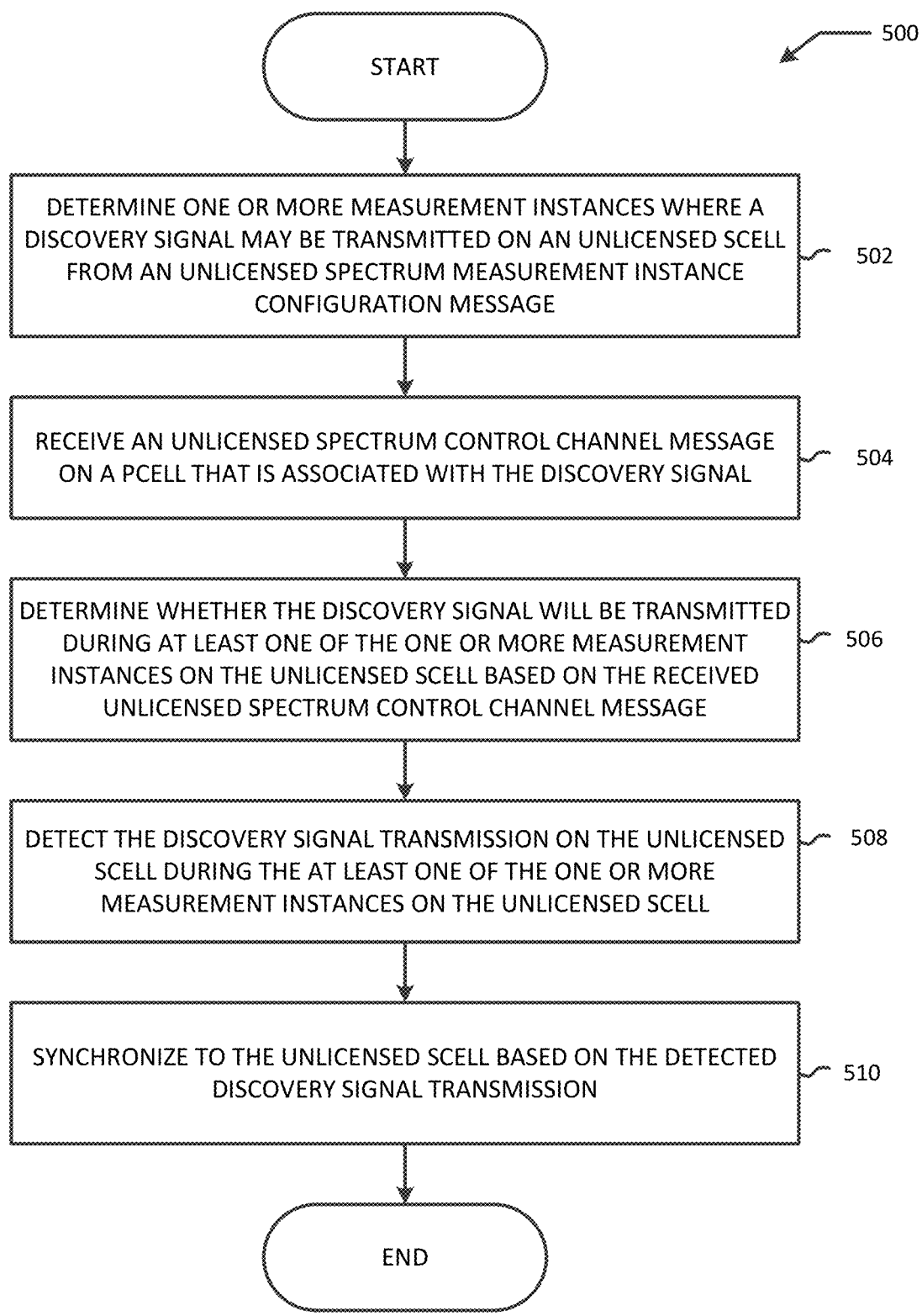
FIG. 5 is a flowchart of an example method for synchronizing to a Scell operating on an unlicensed carrier based on detected discovery signal transmissions in accordance with one example described herein.

FIG. 5 is a flowchart 500 of an example method at a UE, such as UEs 108, 116, that allows for a UE to synchronize to a Scell. The method illustrated in FIG. 5, and each of the example methods described herein, may be carried out by one or more suitably programmed controllers or processors executing software. The methods may also be embodied in hardware or a combination of hardware and hardware executing software. Although the methods are described with reference to the illustrated flowcharts (e.g., in FIG. 5), it will be appreciated that many other ways of performing the acts associated with the methods may be used. For example, the order of some operations may be changed, and some of the operations described may be optional. Additionally, while the methods may be described with reference to the example base station 132 or UEs 108, 116, it will be appreciated that the methods may be implemented by other apparatus as well, and that the base station 132 and UEs 108, 116 may implement other methods.

Method 500 begins at step 502 where one or more measurement instances where a discovery signal may be transmitted on a Scell operating on an unlicensed carrier are determined based on an unlicensed spectrum measurement instance configuration message 120, such as one that may be transmitted by base station 132. The method continues to step 504, where an unlicensed spectrum control channel message 122 that is associated with the discovery signal is received on a Pcell, such as one that may be transmitted from base station 132. The method continues to step 506, where a determination is made as to whether the discovery signal will be transmitted during at least one of the measurement instances on the Scell operating on an unlicensed carrier based on the received unlicensed spectrum control channel message. The method continues to step 508, where the discovery signal transmission is detected on the Scell operating on an unlicensed carrier during at least one of the one or more measurement instances. The method then continues to step 510, where the method includes synchronizing to the S cell operating on an unlicensed carrier based on the detected discovery signal transmission.

Figure 6:
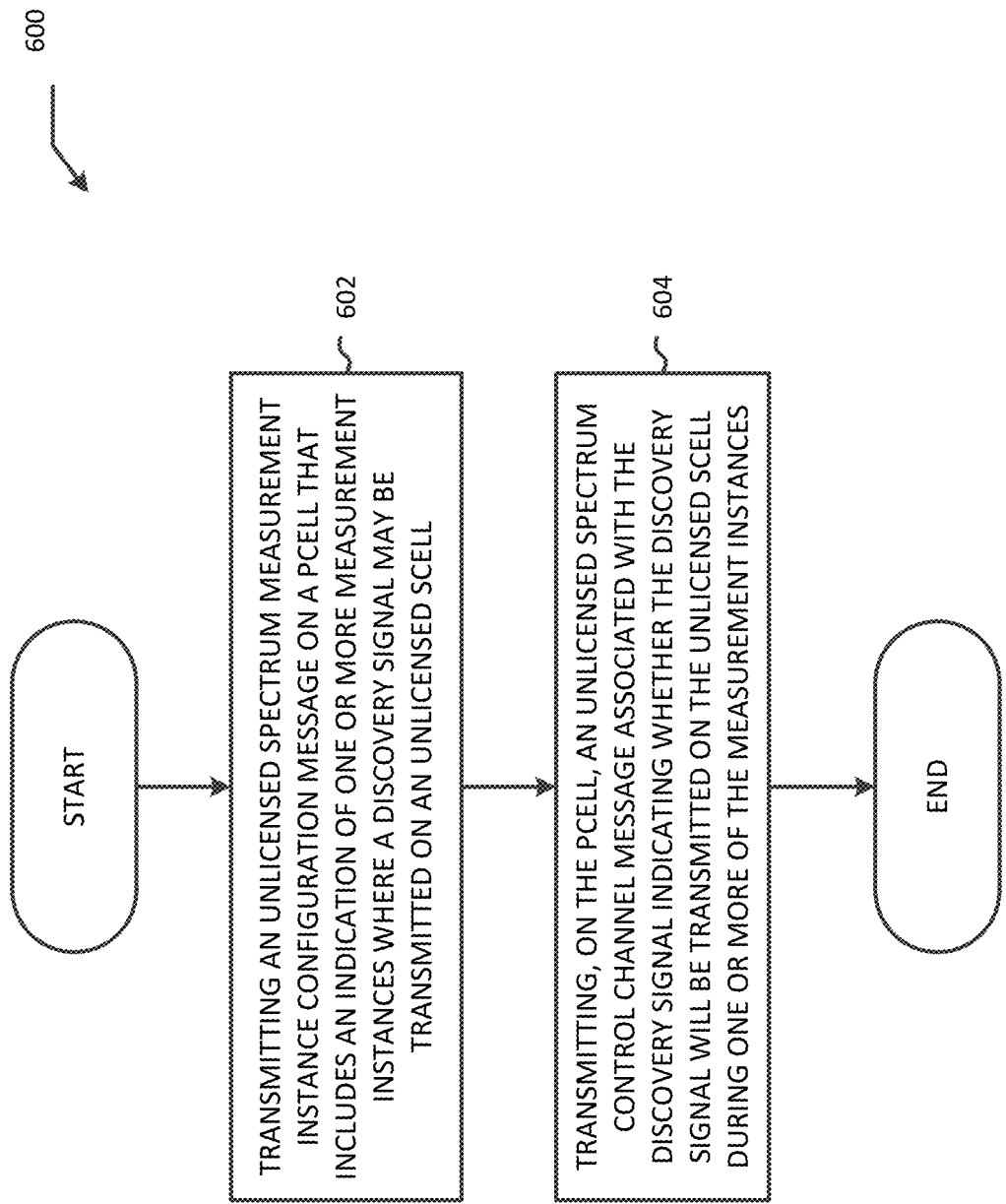
FIG. 6 is an example method at a base station that includes transmissions that allow for the synchronization to a Scell operating on an unlicensed carrier in accordance with one example described herein.

FIG. 6 is a flowchart 600 of an example method at a base station, such as base station 132, that provides transmissions to allow UEs, such as UEs 108, 116, to synchronize to an Scell operating on an unlicensed carrier. The method begins at step 602, where an unlicensed spectrum measurement instance configuration message is transmitted on a Pcell that includes an indication of one or more measurement instances where a discovery signal may be transmitted on a Scell operating on an unlicensed carrier. The method continues to step 604, where an unlicensed spectrum control channel message is transmitted on the Pcell, where the unlicensed spectrum control channel message is associated with the discovery signal and indicates whether the discovery signal will be transmitted on the Scell operating on an unlicensed carrier during one or more of the measurement instances.

Figure 7:
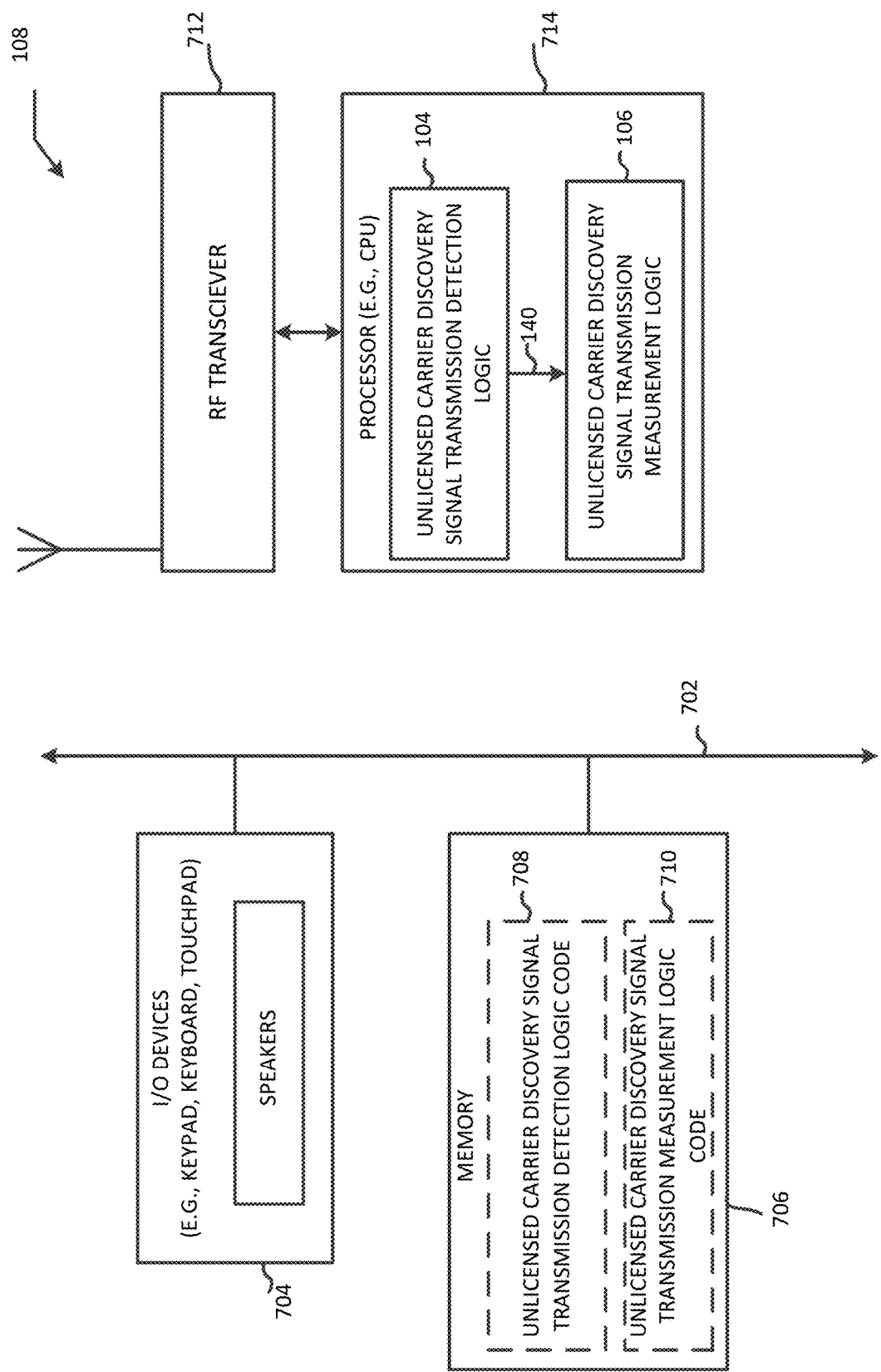
FIG. 7 is a functional block diagram illustrating an example of user equipment in accordance with one example described herein.
Figure 8:
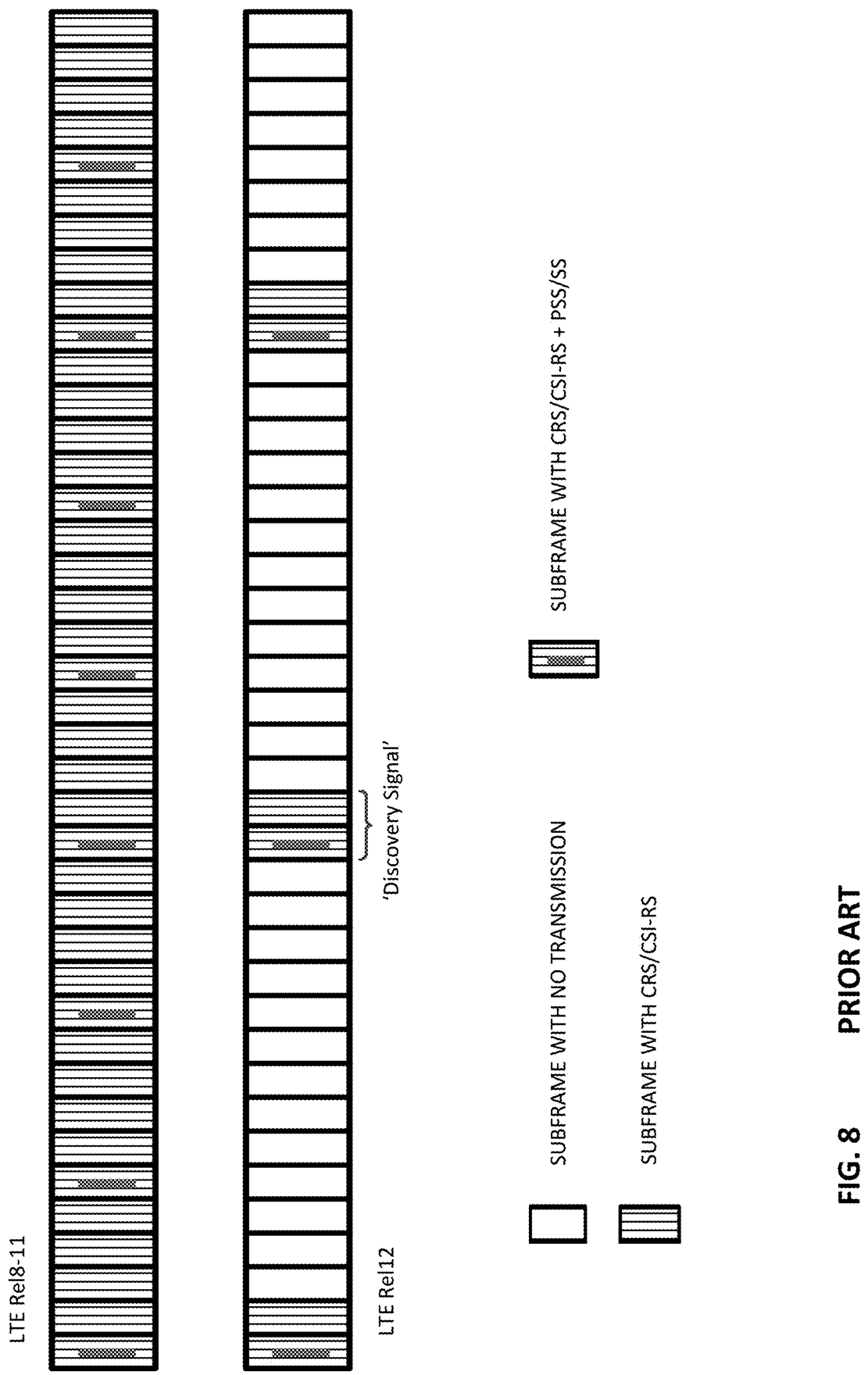
FIG. 8 is a prior art timing diagram of synchronization signal transmissions in LTE communication systems.
Figure 9:
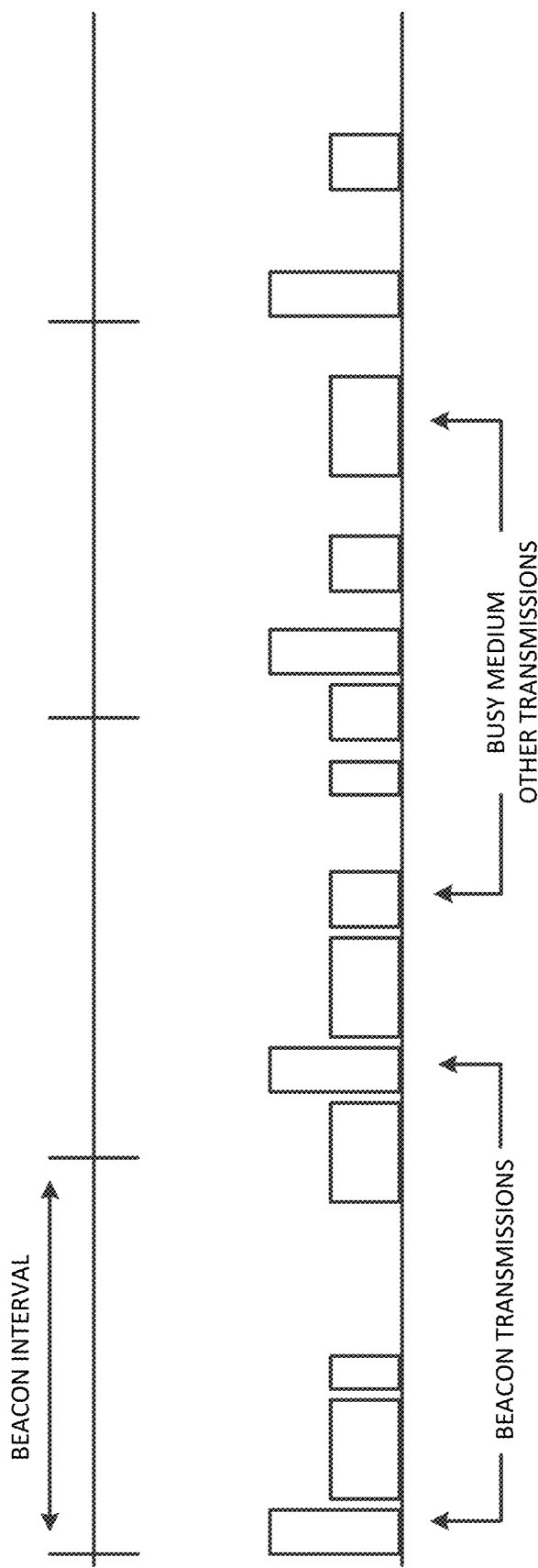
FIG. 9 is a prior art timing diagram of beacon transmissions in Wi-Fi communication systems.
Figure 10:
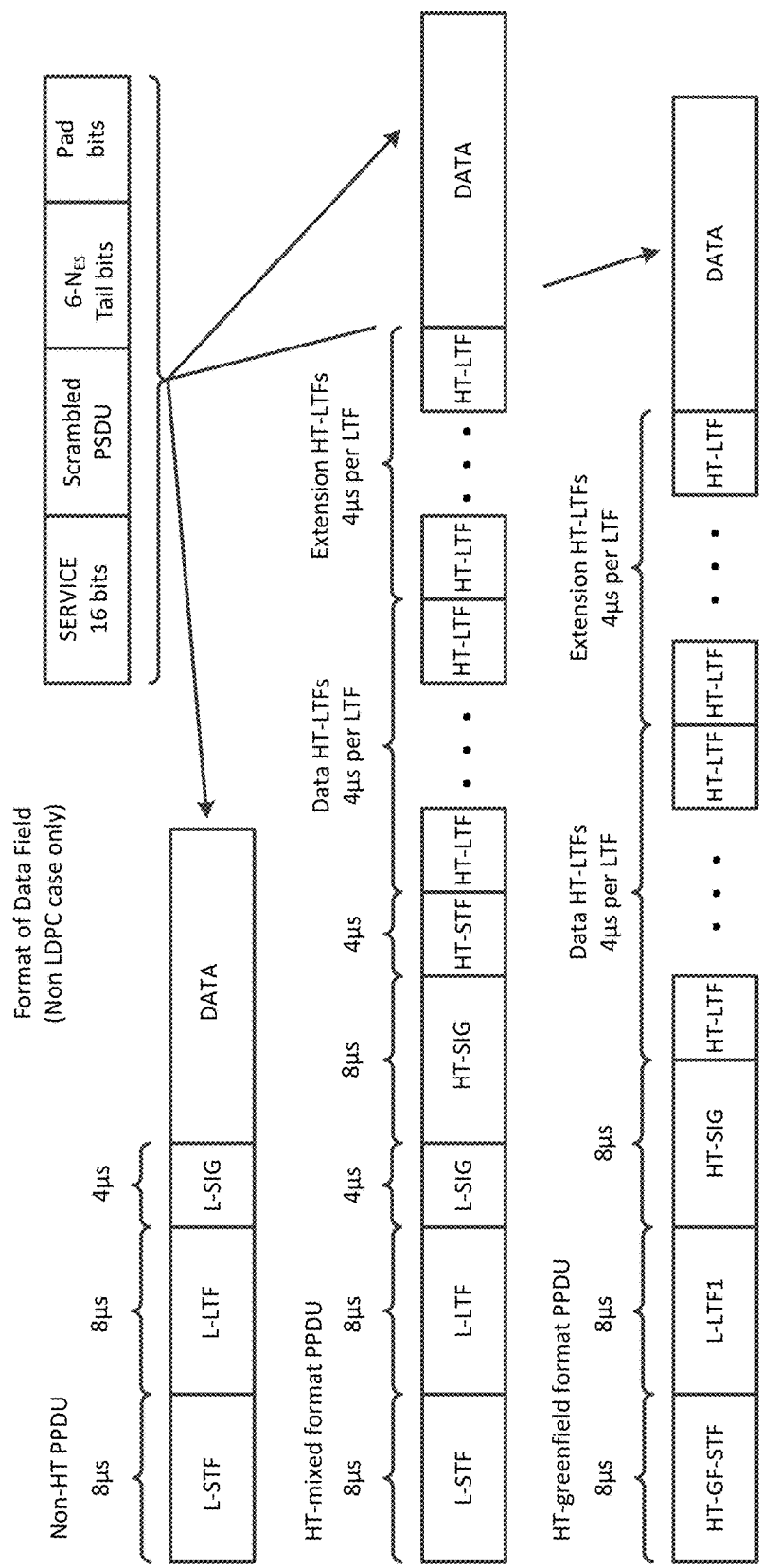
FIG. 10 is a prior art diagram illustrating preamble transmissions in Wi-Fi (release 802.11n).

The apparatus described herein, such as base station 132 and UEs 108, 116, may be manufactured by using a computer program, software, or firmware incorporated in a computer-readable storage medium for execution by logic such as a general purpose computer or a processor. Examples of computer-readable storage mediums include a non-volatile memory (e.g., read only memory (ROM), flash memory, EPROM, EEPROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, FIG. 7 is a functional block diagram illustrating an example of UE 108 that employs RF transceiver 712, processor 714, memory 706, and input output (I/O) devices 704, where each of these devices is operatively coupled to expansion bus 702. Processor 714 may include, for example, unlicensed carrier discovery signal transmission detection logic 104 and unlicensed carrier discovery signal transmission measurement logic 106. Expansion bus 702 may be any suitable bus that allows for communications among the various devices. Memory 706 may be a computer-readable medium such as describe above that stores executable suitable instructions such as unlicensed carrier discovery signal transmission detection logic code 708, and may also include unlicensed carrier discovery signal transmission measurement logic code 710, which may be executed by processor 714. The example apparatus 700 may also include one or more of I/O device 704 that is operatively coupled to expansion bus 702 to allow a user to provide user input.

By allowing for the synchronization to and measurement reporting of unlicensed frequency carriers as described herein, several advantages are contemplated. For example, discovery signals are maintained on unlicensed frequency carriers such that UE's may rely on the discovery signals for synchronization, AGC, signal measurement, and/or measurement reporting purposes, for example. In addition, base stations may be able to transmit discovery signals during periods of time where interference from other devices operating on the same unlicensed spectrum is reduced. Moreover, UE's are able to determine when to expect the discovery signal, which may result in more accurate signal measurement and signal measurement reporting data. Other advantages will be recognized by those of ordinary skill in the art.

Although features and elements are described above in particular combinations, each feature or element can be used alone without the other features and elements or in various combinations with or without other features and elements. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations, or equivalents that fall within the scope of the basic underlying principles disclosed above and claimed herein.

What is claimed is:

1. A method of operating a user equipment (UE) with a secondary cell (Scell) operating on an unlicensed carrier, the method comprising at the UE:
   determining, from an unlicensed spectrum measurement instance configuration message, one or more measurement instances where a discovery signal is scheduled to be transmitted on the S cell;
   monitoring a primary cell (Pcell) operating in licensed spectrum for an unlicensed spectrum control channel message transmitted in the licensed spectrum and associated with the discovery signal, the unlicensed spectrum control channel message confirming whether the discovery signal is expected to be transmitted during at least one of the one or more measurement instances on the Scell as determined from the unlicensed spectrum measurement instance configuration message;
   determining, based on the unlicensed spectrum control channel message, whether the discovery signal is expected to be transmitted during at least one of the one or more measurement instances on the Scell, the determining comprising unsuccessfully decoding the unlicensed spectrum control channel message to determine that the discovery signal is expected to be transmitted during at least one of the one or more measurement instances on the Scell;
   based on the determining whether the discovery signal is expected to be transmitted during at least one of the one or more measurement instances on the Scell, detecting the discovery signal transmission on the Scell during the at least one of the one or more measurement instances on the Scell;
   performing a first measurement on the discovery signal during at least one measurement instance of the one or more measurement instances; and
   reporting a measurement value based on at least the first measurement.

2. The method of claim 1 wherein:
   monitoring, on the Pcell, for the unlicensed spectrum control channel message associated with the discovery signal transmitted on the Scell comprises determining that the unlicensed spectrum control channel message is associated with a radio network temporary identifier (RNTI) configured for the UE; and
   determining whether the discovery signal is expected to be transmitted during at least one of the one or more measurement instances on the Scell comprises:
   successfully decoding the unlicensed spectrum control channel message based on the RNTI; and
   determining that the discovery signal is expected to be transmitted during at least one of the one or more measurement instances on the Scell based upon the successfully decoded unlicensed spectrum control channel message.

3. The method of claim 2, wherein successfully decoding the unlicensed spectrum control channel message based on the RNTI comprises:
   determining downlink control information (DCI) from the unlicensed spectrum control channel message; and
   determining that the discovery signal is expected to be present during at least one of the one or more measurement instances based on information indicated in the DCI.

4. The method of claim 1, wherein:
   receiving, on the Pcell, the unlicensed spectrum control channel message associated with the discovery signal transmitted on the Scell comprises receiving the unlicensed spectrum control channel message in a first subframe; and
   at least one of the determined one or more measurement instances where the discovery signal is scheduled to be transmitted on the Scell at least partially overlaps in time with the unlicensed spectrum control channel message received on the Pcell in a first subframe.

5. The method of claim 1 comprising synchronizing to the Scell based on the detected discovery signal transmission.

6. The method of claim 1, comprising receiving the unlicensed spectrum measurement instance configuration message in a first control channel that is one of a) Physical downlink control channel (PDCCH) and b) Enhanced physical downlink control channel (EPDCCH), wherein the discovery signal comprises periodic transmissions of at least a primary synchronization signal (PSS) and a secondary synchronization signal (SSS).

7. The method of claim 1 wherein:
   receiving, on the Pcell, the unlicensed spectrum control channel message associated with the discovery signal transmitted on the Scell comprises determining that the unlicensed spectrum control channel message is associated with a radio network temporary identifier (RNTI) configured for the UE; and
   determining whether the discovery signal is expected to be transmitted during at least one of the one or more measurement instances on the Scell based on the unlicensed spectrum control channel message comprises:
   successfully decoding the unlicensed spectrum control channel message based on the RNTI;
   determining that the discovery signal is expected to not be transmitted during a next measurement instance of the one or more measurement instances on the Scell based upon the successfully decoded unlicensed spectrum control channel message; and
   determining that the discovery signal is expected to be transmitted during an alternate measurement instance of the one or more measurement instances on the S cell based upon the successfully decoded unlicensed spectrum control channel message.

8. A method in a UE connected to a primary cell (Pcell) operating on a licensed carrier, and configured with a secondary cell (Scell) operating on an unlicensed carrier, method comprising:
   determining, from a higher layer configuration message, a set of measurement instances where a discovery signal can be present; the discovery signal comprising periodic transmissions of at least a primary synchronization signal (PSS) and a secondary synchronization signal (SSS);
   monitoring, on the Pcell, a control channel using a radio network temporary identifier (RNTI) associated with the discovery signal, in a first subframe;
   determining a measurement instance associated with the first subframe from the set of measurement instances;
   attempting to decode the control channel; when the control channel is not successfully decoded in the first subframe, determining that the discovery signal is present in the measurement instance;

performing a first measurement on the discovery signal in at least one measurement instance in the set of measurement instances; and reporting a measurement value based on at least the first measurement.

9. The method of claim 8, wherein the measurement instance at least partially overlaps with the first subframe in time domain.

10. The method of claim 8, wherein the first control channel is one of a) Physical downlink control channel (PDCCH) and b) Enhanced physical downlink control channel (EPDCCH).

11. The method of claim 8, wherein determining that the discovery signal is not present in the measurement instance, if the control channel is successfully decoded in the first subframe further comprises:

determining a DCI (downlink control information) from the successfully decoded control channel; and determining that the discovery signal is not present in the measurement instance based on information indicated in the DCI.

12. The method of claim 8 further comprising:

determining an alternate measurement instance and a second subframe from the control channel, if the control channel is successfully decoded;

monitoring, on the Pcell, the control channel using the radio network temporary identifier (RNTI) associated with the discovery signal, in the second subframe;

determining that the discovery signal is present in the alternate measurement instance, if the control channel is not successfully decoded in the second subframe;

performing a second measurement on the discovery signal in the alternate measurement instance; and reporting a measurement value based on at least the second measurement.

13. The method of claim 12, wherein:

the alternate measurement instance does not belong to the set of measurement instances determined from the higher layer configuration message, and the alternate measurement instance does not overlap with the first subframe in time domain.

\* \* \* \* \*

UNITED STATES PATENT AND TRADEMARK OFFICE
CERTIFICATE OF CORRECTION

PATENT NO. : 10,581,547 B2
APPLICATION NO. : 14/867900
DATED : March 3, 2020
INVENTOR(S) : Ravikiran Nory et al.

Page 1 of 1

It is certified that error appears in the above-identified patent and that said Letters Patent is hereby corrected as shown below:

In the Specification

Column 13, Lines 18 and 19, after "the" before "monitoring" delete "S cell;" insert --Scell;--

Column 14, Lines 48 and 49, after "the" before "based" delete "S cell" insert --Scell--

Signed and Sealed this
Twenty-first Day of April, 2020

Andrei Iancu
*Director of the United States Patent and Trademark Office*